United States Patent [19]

Mattes et al.

[11] 3,959,585
[45] May 25, 1976

[54] GRAPHICAL INPUT TERMINAL

[75] Inventors: Hans George Mattes, Ocean Township, Monmouth County; Gabor Peter Torok, Lincroft, both of N.J.

[73] Assignee: Bell Telephone Laboratories, Incorporated, Murray Hill, N.J.

[22] Filed: Feb. 1, 1974

[21] Appl. No.: 438,723

[52] U.S. Cl. .................................................. 178/18
[51] Int. Cl.² ....................................... G08C 21/00
[58] Field of Search ............ 178/18, 19, 20; 338/90; 33/1 M, 1 SD; 340/347 AD; 35/61–67; 346/21

[56] References Cited
UNITED STATES PATENTS

| | | | |
|---|---|---|---|
| 2,975,235 | 3/1961 | Leitner et al. | 178/18 |
| 3,005,050 | 10/1961 | Koenig, Jr. | 178/20 |
| 3,662,105 | 5/1972 | Hurst et al. | 178/18 |
| 3,798,370 | 3/1974 | Hurst | 178/18 |
| 3,885,097 | 5/1975 | Pobgee | 178/18 |

*Primary Examiner*—Thomas A. Robinson
*Attorney, Agent, or Firm*—Barry H. Freedman

[57] ABSTRACT

A graphical input terminal includes a pair of resistive sheets separated by an air gap. An energizing voltage is alternately applied to each sheet while an output voltage representative of the position of contact between the sheets caused by the pressure of a stylus, is derived from the nonenergized sheet. A circuit for indicating stylus up/stylus down status without undue interference from capacitively induced voltages is also provided.

6 Claims, 4 Drawing Figures

GRAPHICAL INPUT TERMINAL

BACKGROUND OF THE INVENTION

1. Field of the Invention

This invention relates generally to input terminals useful in telautograph systems and, more particularly, to such terminals which provide an electrical indication of the position of a stylus, writing implement or the like with respect to a writing surface.

2. Description of the Prior Art

Numerous telautograph systems, such as the one disclosed in U.S. Pat. No. 3,706,850 issued to G. M. C. Fisher et al. on Dec. 19, 1972, have been devised to communicate graphical information such as handwriting from the point of origination to a distant location. Each such system requires an input terminal that is capable of generating an electrical indication representative of the position of a stylus on a writing or input surface. Briefly described, one type of input terminal that has been proposed includes a resistive sheet and a conductive sheet separated by a small air gap. An energizing potential is applied to the resistive sheet alternately across its "X" and "Y" dimensions, thereby establishing a voltage gradient along each axis. When the resistive sheet is brought in contact with the conductive sheet at a given point under the pressure of a stylus or other writing implement, the voltage output derived from the latter is thus alternately representative of the position of said point along each axis. While this type of input terminal has many advantages over the other apparatus serving a similar function, it also has at least one serious drawback, occasioned by the use of a single resistive sheet to obtain positional information with respect to two axes. Specifically, the energizing potential must be applied to the resistive sheet in a manner in which the points of application along one dimension do not interfere with the points of application along the other dimension. Accordingly, a continuous or strip electrode cannot be affixed to the edges of the resistive sheet, since a strip applied along the X dimension will act as a short circuit during time intervals when the energizing potential is applied across the Y dimension, and vice-versa. Instead, the energizing potential must be applied at discrete electrode points along each axis via diodes or other similar devices that permit conduction in one direction only, and thereby electrically isolate tha nonconducting or "off" electrodes from the energized or "on" electrodes. These diodes, besides adding to the cost and complexity of the input terminal, result in the production of a nonuniform voltage gradient on the resistive sheet, especially near its edges. As a result, the useful writing area of the terminal must be reduced if a truly linear output is desired, or, alternatively, a certain amount of distortion or nonlinearity must be tolerated.

In an attempt to reduce nonlinearity, another type of input terminal known in the prior art utilizes a trilaminar arrangement of first and second resistive layers and a top conductive layer, each separated by a small air gap. An energizing potential is applied alternatively to the resistive layers so as to create a voltage gradient across the X dimension of the first sheet during one time interval and a voltage gradient across the Y dimension of the second sheet during the other time interval. Since two separate resistive layers are used, continuous or strip electrodes may be employed without intersheet interference. However, the trilaminar arrangement is difficult to implement mechanically, and requires a middle layer that is resistive in its thickness dimension as well as across its surface, since the top conductive layer must make electrical contact with the bottom resistive layer when the latter is energized.

With respect to both of the above types of known input terminals, still another problem commonly experienced relates to the generation of stylus-up, stylus-down indications. Specifically, it is desirable to provide an electrical indication at the remote location of whether the stylus is writing or idle. One method of obtaining this indication is to provide a receptacle for the stylus when not in use, the receptacle being arranged to generate a signal when the stylus is lodged therein. Besides being unduly complicated, this approach has been found to be undesirable for the reason that the stylus may not be returned to the receptacle and nevertheless not be in use. Another more desirable method of generating stylus-up, stylus-down signals is to monitor the electrical output of the conductive sheet: when the output attains a value within the prescribed limits of the voltage gradient established across the resistive sheets, the stylus is thus known to be in use. Unfortunately, use of this method may also pose problems, since the resistive sheet or sheets, in combination with the conductive layer, behave like a capacitor, so that the conductive sheet output may remain within the prescribed limits long after the stylus has ceased to be in use, as a result of a lengthy discharge time.

In view of the foregoing, it is the broad object of the present invention to provide an improved graphical input terminal. Specific objects include the design of such a terminal which utilizes only two layers, does not require large numbers of diodes or other unidirectional conduction elements, and which generates distortion free output signals that are completely linear over the entire writing surface. A still further object of the invention is the generation of a stylus-up, stylus-down indication that is reliable and is unaffected by the internal capacitance of the input terminal.

SUMMARY OF THE INVENTION

The foregoing and additional objects are achieved in accordance with the principles of the instant invention by a graphical input terminal which includes first and second resistive sheets on layers spaced apart by a small air gap or other normally nonconducting material. The sheets overlap in an area denominated the active writing surface, every point of which is uniquely described by a pair of coordinates along two nonparallel axes. For convenience, these axes may be assumed to be orthogonal, thereby defining X and Y dimensions. A source of energizing potential is arranged to alternately generate a uniform voltage gradient across the X dimension of the first resistive sheet and the Y dimension of the second resistive sheet. An output circuit is also arranged for alternate connection to the first and second resistive sheets, connection being made to the nonenergized sheet. In operation, when a stylus is applied to the active writing surface, contact is made between the resistive sheets at the point of application. Accordingly, when the first resistive sheet (having the X dimension gradient) is energized, a voltage indicative of the position of the point of application along the X axis is transmitted to the output circuit via the second resistive sheet, which is not energized. Similarly, when the second resistive sheet (having the Y dimension gradient) is energized, a voltage indicative of the position of the point of application along the Y axis is transmitted to the output circuit via the first resistive sheet, which is not energized.

By virtue of the aforedescribed arrangement of a graphical input terminal in which each resistive sheet is alternately used as a transmitter (when energized) and as a receiver or sensor (when not energized), only two layers are required. In addition, since each layer or sheet is used for generation of a voltage gradient in a single direction, the energizing potential may be applied thereto via continuous or strip electrodes, without the necessity for large numbers of diodes or other unidirectional conducting elements. Furthermore, the output voltages that are generated are free of distortion, being completely linear over the entire active writing surface.

An input terminal in accordance with the instant invention also includes a stylus-up, stylus-down circuit which is arranged to connect the non-energized resistive sheet for a first portion of the time interval during which the sheet is not energized, to a source of reference potential having a voltage outside of the range of voltages applied to the energized sheet. In this way, whenever the stylus is lifted from the active writing surface, the voltage applied to the output circuit is quickly brought to a level indicative of the idle condition, without interference caused by the internal capacitance of the resistive sheets. On the other hand, when the stylus is in use, operation of the terminal is unaffected by the reference voltage, since the output signal is monitored only during a second portion of the time interval in which the reference potential is not connected.

BRIEF DESCRIPTION OF THE DRAWING

The aforementioned and other features and advantages of the instant invention will become more readily apparent to persons skilled in the art by reference to the following detailed description, when read in light of the accompanying drawing in which.

DETAILED DESCRIPTION

Figure 1:
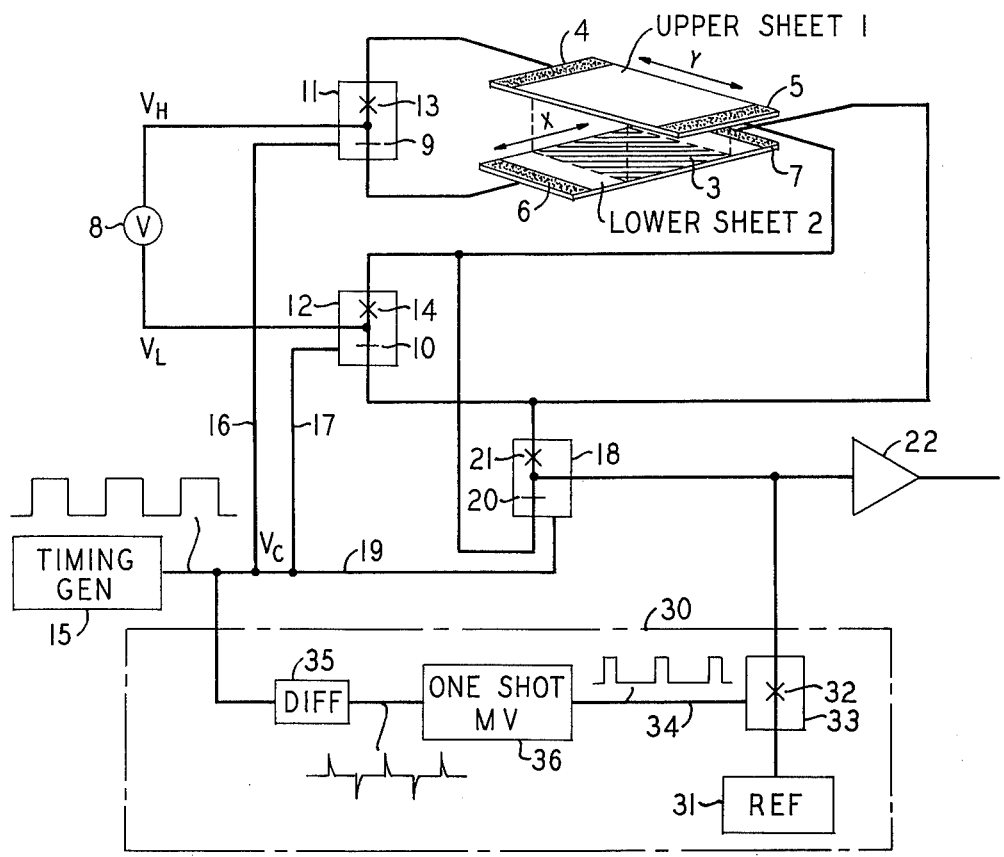
FIG. 1 is a block diagram of a graphical input terminal constructed in accordance with the principles of the instant invention.

As shown in FIG. 1, a graphical input terminal in accordance with the instant invention includes two generally rectangular layers or sheets 1, 2 of resistive material aligned so as to overlap in a central area 3, shown shaded, which is the active writing surface. The resistive sheets may be fabricated from a conductive ink, such as carbon loaded Viton, or other suitable material having a resistance of approximately 10–1000 ohms/square, reverse rolled onto a polyester sheet. Sheets 1 and 2 are spaced apart from each other by a small air gap, typically 1.5 millimeters or, alternatively, separated by a thin layer of an electrically switching polymer, such as "Pressex" manufactured by Essex International, which is normally an electrical insulator but which becomes conductive upon the application of pressure over a suitable threshold.

Affixed to opposite edges of sheets 1 and 2 are continuous or stip electrodes 4, 5 and 6, 7, respectively, which may be fabricated from a conductive material such as silver. When an energizing potential is applied to electrodes 4 and 5, a voltage gradient is established across sheet 1 in a direction perpendicular to the electrodes. Similarly, application of an energizing potential to electrodes 6 and 7 produces a voltage gradient across sheet 2 in a direction perpendicular to those electrodes. While electrodes 4, 5 and 6, 7 may be arranged to generate voltage gradients on sheets 1 and 2 in any two different (nonparallel) directions, for convenience, as shown in FIG. 1, electrodes 4 and 5 run parallel to the X axis and electrodes 6 and 7 run parallel to the Y axis, so that orthogonal gradients in the Y and X directions are created on sheets 1 and 2, respectively. Accordingly, every point of central area 3 is uniquely defined by a position along the X and Y directions or axes.

A source 8 of energizing potential is connected across electrodes 6 and 7 of sheet 2 via normally closed contacts 9, 10 of switches 11, 12, respectively. When switches 11 and 12 are actuated, contacts 9 and 10 are opened, and normally open contacts 13 and 14 are closed, thereby transferring source 8 to a connection across electrodes 4 and 5 of sheet 1. Switches 11 and 12 are controlled via leads 16 and 17, respectively, by a timing generator 15 which produces a square wave or alternate high-low output. Generator 15 also controls, via lead 19, an additional switch 18, which includes normally closed contact 20 and normally open contact 21. The former connects electrode 5 of sheet 1 to the input of a high input impedance amplifier 22, while the latter, when closed by a high output on lead 19, transfers the connection to amplifier 22 to electrode 7 of sheet 2.

In summary, it can be seen from the foregoing that resistive sheets 1 and 2 are alternately energized by source 8 under the control of switches 11 and 12, and that whenever one sheet is energized and acts as a transmitter, the other sheet, which is electrically "floating," is connected to amplifier 22 via switch 18, and acts as a sensor. When the sheets are brought into contact with each other by the depression of a stylus on the active writing surface, the voltage on the energized sheet at the point of application is picked up by the nonenergized sheet and transmitted to amplifier 22. Specifically, when the output of timing generator 15 is low, resistive sheet 2 is energized, and the voltage on sheet 1 applied to the input of amplifier 22 represents the X ordinate of the stylus position; when the output of timing generator 15 is high, resistive sheet 1 is energized, and the voltage on sheet 2 applied to the input of amplifier 22 represents the Y ordinate of the stylus position. The output of amplifier 22 may be transmitted to a distant location and suitably decoded or otherwise processed to graphically indicate the position of the stylus.

Figure 2:
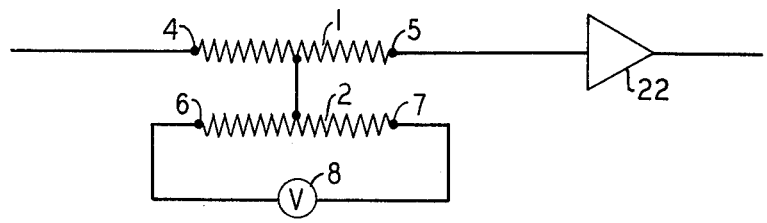
FIGS. 2 and 3 are schematic diagrams of a portion of the graphical input terminal of FIG. 1 during different time intervals.
Figure 3:
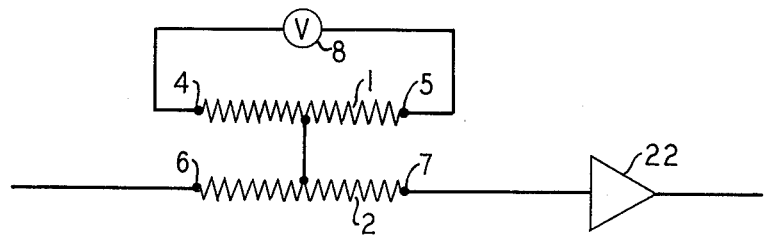

Referring now to FIGS. 2 and 3, there is shown a schematic diagram of a portion of the graphical input terminal of FIG. 1, during different time intervals. In FIG. 2, resistive sheet 2, indicated by its equivalent resistance, is energized by connection to source 8, and resistive sheet 1, indicated by its equivalent resistance, is connected to amplifier 22 via electrode 5. When the sheets are brought into contact at a point under the pressure of a stylus, the voltage on sheet 2, representative of the X axis location of the stylus, is transmitted through sheet 1 to amplifier 22. In this condition, the Y axis location of the stylus does not affect the output voltage, since the impedance of amplifier 22 is much larger than that of sheet 1. Similarly, in FIG. 3, resistive sheet 1 is energized by connection to source 8, and resistive sheet 2 is connected to amplifier 22 via electrode 7. In this condition, the voltage on sheet 1, representative of the Y axis location of the stylus, is transmitted through sheet 2 to amplifier 22, the X axis location of the stylus having no effect on the output voltage for the reason stated above. Accordingly, it will be apparent to those skilled in the art that the output voltages of the aforedescribed graphical input terminal are truly linear in nature, since the X and Y axis voltages do not interact.

Returning now to FIG. 1, an additional circuit for assuring a reliable stylus-up, stylus-down indication at the output of amplifier 22 is shown in the dotted area 30. This circuit is particularly desirable when large resistive sheets are used, since the capacitance between the sheets can be large enough to cause potentials on the sensor sheet even when the stylus is not depressed, resulting in the application of erroneous signals to amplifier 22. The circuit includes a voltage source 31 connected to the input of amplifier 22 via the normally open contact 32 of a switch 33. Source 31 is arranged to provide a reference voltage outside of the range of voltages applied to resistive sheets 1 and 2. Switch 33 is actuated, closing contact 32, by application of a voltage on line 34 which is high during a first portion, preferably the beginning, of each high or low time interval defined by the output of timing generator 15. This voltage may be generated simply by differentiating the output of generator 15 in differentiator 35, and applying the output thereof to a one-shot multivibrator 36 arranged to produce output pulses of the desired duration.

In operation, the aforedescribed circuit assures that the nonenergized resistive sheet is maintained at a voltage different from the operating voltage on the energized sheet for at least a portion, preferably the beginning, of the time interval that the former is operating as a sensor. Accordingly, the capacitive effect exhibited by the resistive sheets is eliminated, and the output voltage of amplifier 22, monitored only during the second or remaining portion of each time interval defined by the output of generator 15 by circuitry not shown, provides a reliable indication of whether the stylus is in use or idle. Further, it is to be noted that if voltage source 8 is arranged with high and low outputs that supply resistive sheets 1 and 2 with a source and sink voltage both above (or below) ground potential, the same advantageous result may be obtained by replacing voltage source 31 with a simple connection to ground potential.

Figure 4:
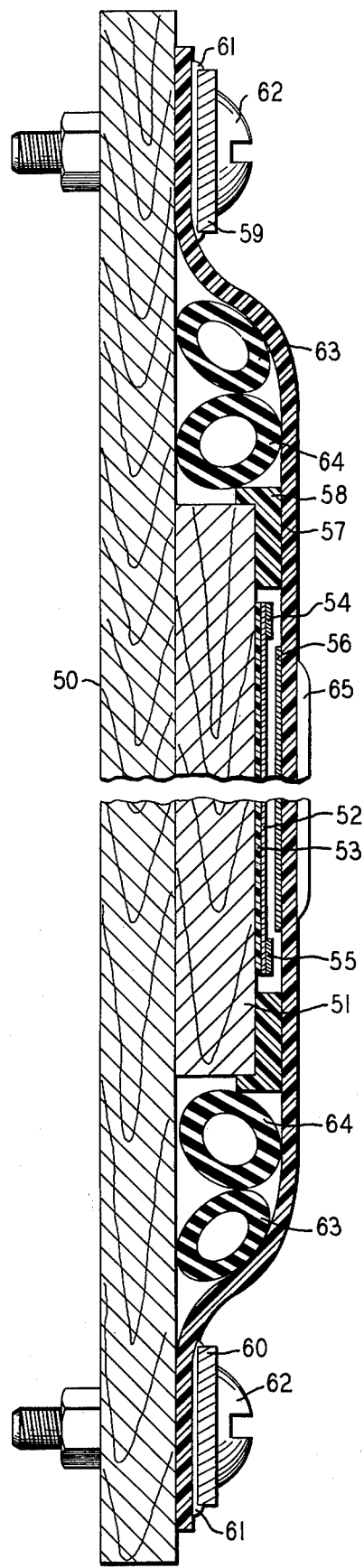
FIG. 4 is a cross-sectional view showing the construction details of the active writing surface portion of the input terminal of FIG. 1.

A graphical input terminal having a large (e.g., 1 m. × 1.5 m.) writing surface and intended for use as a chalkboard may be constructed in accordance with the invention as shown in FIG. 4. A sheet 50 of ½ inch plywood may be used as a base or support board. Affixed to the central area of sheet 50 is a spacer board 51 constructed of aluminum or fibre honeycomb dimensioned slightly larger than the desired writing area and manufactured flat over that area to within ± 0.25 mm. The first resistive layer 52 may consist of a conductive ink such as carbon loaded Viton (manufactured by E. I. Dupont) reverse rolled onto a 3 mil polyester sheet 53 which is in turn laminated onto board 51 using a suitable adhesive. The reverse-roll process is preferred since it is capable of maintaining good flatness uniformity over the writing area. A pair of silver strip electrodes 54,55 may then be affixed to opposite edges of layer 52 using electrically conductive cement.

The second resistive layer 56 may similarly be formed on a polyester sheet 57 which is advantageously somewhat larger than sheet 53. A layer 65 of chalkboard paint may be applied to the opposite side of sheet 57. A pair of silver strip electrodes (not shown) are also affixed to this layer, but along the edges opposite to those to which electrodes 54 and 55 are affixed. The resistive layers are maintained in spaced relation by positioning a 1.5 mm thick plastic spacer 58 around the edges of spacer board 51, and placing sheet 57 over spacer 58 with resistive layer 56 facing resistive layer 52. Sheet 57 may be anchored by attaching four aluminum strips (strips 59, 60 shown) to the perimeter of the sheet by a layer 61 of epoxy, and fastening the strips to board 50 with bolts 62. Tension in sheet 57 is advantageously maintained by placing two rows 63,64 of 1 cm diameter neoprene tubing around the perimeter of spacer board 51.

While the invention has been described with reference to specific embodiments thereof, it is to be understood that various modifications thereto may be made by those skilled in the art without departing from the spirit and scope of the following claims.

What is claimed is:

1. Apparatus for generating an electrical representation of the location of a stylus on a writing area, comprising first and second resistive sheets overlapping in a common writing area and spaced apart from each other by a gap, said sheets adapted for contact with each other at a point on said writing area under the pressure of said stylus, a source of energizing potential having high and low outputs, first means for connecting said high and low outputs across said first resistive sheet to generate a first voltage gradient across said first sheet in a first direction, second means for connecting said high and low outputs across said second resistive sheet to generate a second voltage gradient across said second sheet in a second direction different from said first direction, each point on said writing area thereby being uniquely defined by a unique combination of voltages on said first and second resistive sheets at said point, third means for alternately actuating said first and second means, thereby defining alternate time intervals during which one of said resistive sheets is energized and the other one of said resistive sheets is nonenergized, an output circuit, and fourth means for connecting said nonenergized resistive sheet to said output circuit during at least one portion of said time interval in which said sheet is nonenergized, wherein said gap includes a layer of material which is an electrical insulator in the absence of pressure applied thereto and an electrical conductor in the presence of pressure applied thereto.

2. The invention defined in claim 1 wherein said high and low outputs of said source of energizing potential are both above ground potential.

3. The invention defined in claim 2 further including fifth means for connecting said nonenergized resistive layer to ground potential during another portion of said time interval in which said layer is nonenergized.

4. Apparatus for providing an electrical indication of the position of a stylus on a writing area, comprising
first and second spaced apart resistive sheets overlapping in said writing area and adapted for contact with each other under the pressure of said stylus applied at a point on said area,
first means for alternately energizing said first and second sheets to alternately establish a voltage gradient on each of said sheets in a different direction, so that said point on said writing area is represented by a unique pair of voltages on said first and second sheets,
an output circuit adapted to receive said electrical indication, and
second means cooperating with said first means for connecting the nonenergized one of said sheets to said output circuit,
wherein said apparatus further includes at least one row of flexible material positioned around the perimeter of said writing area for generally maintaining said first and second sheets in spaced relation, and
wherein at least one of said resistive sheets is a composite structure comprising a central polyester sheet, a resistive layer formed on one side of said polyester sheet, and a layer of chalkboard paint formed on the other side of said polyester sheet.

5. The invention defined in claim 4 wherein said resistive layer comprises a conductive ink reverse rolled onto said polyester sheet.

6. Apparatus for providing an electrical indication of the position of a stylus on a writing area, comprising
first and second spaced apart resistive sheets overlapping in said writing area and adapted for contact with each other under the pressure of said stylus applied at a point on said area,
first means for alternately energizing said first and second sheets to alternately establish a voltage gradient on each of said sheets in a different direction so that said point on said writing area is represented by a unique pair of voltages on said first and second sheets,
an output circuit adapted to receive said electrical indication, and
second means cooperating with said first means for connecting the nonenergized one of said sheets to said output circuit,
wherein said apparatus further includes at least one row of flexible material positioned around the perimeter of said writing area for generally maintaining said first and second sheets in spaced relation, and
wherein said flexible material comprises a cylindrical neoprene tube.

* * * * *